US012387115B2

United States Patent
Mahmood et al.

(10) Patent No.: US 12,387,115 B2
(45) Date of Patent: Aug. 12, 2025

(54) AUTOMATED MACHINE LEARNING TO GENERATE RECOMMENDATIONS FOR WEBSITES OR APPLICATIONS

(71) Applicant: Amplitude Inc., San Francisco, CA (US)

(72) Inventors: Muhammad Bilal Mahmood, Palo Alto, CA (US); William Robert Pentney, San Francisco, CA (US); Eric M Pollmann, Los Altos, CA (US); Cynthia E Rogers, Boston, MA (US); Mustafa Paksoy, San Francisco, CA (US); Zachery Abe Miranda, San Francisco, CA (US)

(73) Assignee: Amplitude Inc., San Francisco, CA (US)

( * ) Notice: Subject to any disclaimer, the term of this patent is extended or adjusted under 35 U.S.C. 154(b) by 1205 days.

(21) Appl. No.: 17/187,737

(22) Filed: Feb. 26, 2021

(65) Prior Publication Data

US 2022/0277205 A1 Sep. 1, 2022

(51) Int. Cl.
*G06F 17/00* (2019.01)
*G06F 16/9535* (2019.01)
*G06N 5/02* (2023.01)
*G06N 5/04* (2023.01)
*G06N 3/08* (2023.01)
*G06N 20/00* (2019.01)

(52) U.S. Cl.
CPC .......... *G06N 5/04* (2013.01); *G06F 16/9535* (2019.01); *G06N 5/02* (2013.01); *G06N 3/08* (2013.01); *G06N 20/00* (2019.01)

(58) Field of Classification Search
CPC .. G06N 5/04; G06N 5/02; G06N 3/08; G06N 20/00; G06F 16/9535
See application file for complete search history.

(56) References Cited

U.S. PATENT DOCUMENTS 9,767,417 B1 * 9/2017 Hoover ............... G06F 16/9535
11,163,843 B1 * 11/2021 Li .......................... G06F 16/906
(Continued)

OTHER PUBLICATIONS

Dinh V. Cuong et al., A Framework for Paper Submission Recommendation System. In Proceedings of the 2020 International Conference on Multimedia Retrieval. Association for Computing Machinery, 393-396. <https://doi.org/10.1145/3372278.3391929>, Jun. 2020.*

(Continued)

Primary Examiner — Greta L Robinson
(74) Attorney, Agent, or Firm — IP SPRING

(57) ABSTRACT

Implementations described herein relate to methods, systems, and computer-readable media for automated generation and use of a machine learning (ML) model to provide recommendations. In some implementations, a method includes receiving a recommendation specification that includes a content type and an outcome identifier, and determining model parameters for a ML model based on the recommendation specification. The method further includes generating a historical user feature matrix (FM), generating a historical content feature matrix (FM), and transforming the historical user FM and the historical content FM into a suitable format for the ML model. The method further includes obtaining a target dataset that includes historical results for the outcome identifier for a plurality of pairs of user identifiers and content items of the content type. The method further includes training the ML model using supervised learning to generate a ranked list of content items for each user identifier.

15 Claims, 10 Drawing Sheets

(56) References Cited

U.S. PATENT DOCUMENTS

| | | | |
|---|---|---|---|
| 11,361,239 B2* | 6/2022 | R | G06Q 30/0201 |
| 11,605,117 B1* | 3/2023 | Zavaleta | H04N 21/251 |
| 2018/0096437 A1* | 4/2018 | Sun | G06F 16/29 |
| 2018/0218429 A1 | 8/2018 | Guo et al. | |
| 2019/0373331 A1* | 12/2019 | Benzatti | H04N 21/4662 |
| 2020/0005335 A1* | 1/2020 | Wang | G06F 16/9535 |
| 2020/0134696 A1* | 4/2020 | Lardeux | G06Q 30/0254 |

OTHER PUBLICATIONS

Viet Ha-Thuc et al., A Counterfactual Framework for Seller-Side A/B Testing on Marketplaces. In Proceedings of the 43rd International ACM SIGIR Conference on Research and Development in Information Retrieval. Association for Comp. Machinery, 2288-2296.<https://doi.org/10.1145/3397271.3401434>, Jul. 2020.*

"International Search Report and Written Opinion in International Application No. PCT/US2022/017838", Jun. 20, 2022.

"Introducing Nova AutoML: A New Architecture for Predictive Insights" dated Aug. 18, 2020, https://blog.amplitude.com/introducing-nova-automl-a-new-architecture-for-predictive-insights.

"Introducing Predictive Cohorts: Power Your Marketing Campaigns with Machine Learning" dated Sep. 16, 2020, https://blog.amplitude.com/introducing-predictive-cohorts.

"Leave Content and product recommendations to decision-making algorithms", https://www.dynamicyield.com/recommendations/, Mar. 3, 2021.

"Work Smarter with artificial intelligence that's built right into Salesforce", https://www.salesforce.com/in/products/einstein/overview/, Mar. 3, 2021.

* cited by examiner

User Feature Matrix 202

| User ID | Device Type | Device OS | App/website | Country | Tap Content Week 1 | Tap Content Week 2 | View Content Week 1 | View Content Week 2 | Bought Sandwich Week 1 | Bought Soda Week 1 | |
|---|---|---|---|---|---|---|---|---|---|---|---|
| 1 | Phone | iOS | App | USA | 20 | 40 | 22 | 30 | TRUE | TRUE | ... |
| 2 | Phone | Android | App | USA | 10 | 12 | 15 | 8 | TRUE | FALSE | |
| 3 | Computer | MacOS | Website | Canada | 11 | 5 | 15 | 12 | FALSE | FALSE | |
| 4 | Tablet | iOS | Website | USA | 0 | 0 | 6 | 12 | TRUE | FALSE | |
| 5 | Tablet | Android | App | Mexico | 15 | 5 | 15 | 5 | FALSE | TRUE | |
| ... | | | | | | | | | | | |

FIG. 2A

Content Feature Matrix 204

| Content ID | Content Title | Content category | Digital? | Wearable | Avg Calories | |
|---|---|---|---|---|---|---|
| 1 | Smartwatch | Electronics | FALSE | TRUE | 0 | ... |
| 2 | Shirt A | Clothing | FALSE | TRUE | 0 | |
| 3 | Salt | Food | FALSE | FALSE | 20 | |
| 4 | Soda Y | Beverage | FALSE | FALSE | 25 | |
| 5 | Salt | Movies | TRUE | FALSE | | |
| ... | | | | | | |

FIG. 2B

AUTOMATED MACHINE LEARNING TO GENERATE RECOMMENDATIONS FOR WEBSITES OR APPLICATIONS

BACKGROUND

Websites and applications (e.g., mobile or desktop applications) exist that provide various services to users, e.g., online shopping, social networking, audio/video playback, news, etc. Websites and applications benefit from providing personalized experiences to their users, e.g., by improving user engagement, retaining users, promoting purchases, etc.

Provision of personalized experiences relies on the use of recommendation algorithms, including rule-based and machine learning based algorithms that require substantial manual effort to implement. Such algorithms may rank content items (e.g., products available for purchase, audio/video items, etc.) for individual users. However, providing personalized experiences is difficult due to various technical difficulties. User data of websites and applications may be distributed across multiple systems and siloed (lacking coherent user identity) and may require integration prior to generation of personalized experiences. Also, generation of appropriate rule-based or machine learning based recommendations may require specialized expertise, leading to slow deployment and incorrect recommendations.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein related to methods, systems, and computer-readable media for automated generation and use of a machine learning (ML) model to provide recommendations.

In some implementations, a computer-implemented method includes receiving a recommendation specification that includes a content type and an outcome identifier. The method further includes determining one or more model parameters for a machine learning model based at least in part on the recommendation specification. The method further includes generating a historical user feature matrix (FM) based on historical user data. The method further includes generating a historical content feature matrix (FM) based on historical content data. The method further includes transforming the historical user FM and the historical content FM into a suitable format for the machine learning model. The method further includes obtaining a target dataset based on the historical user data, wherein the target dataset includes historical results for the outcome identifier for a plurality of pairs of user identifiers and content items of the content type. The method further includes training the machine learning model using supervised learning to generate a ranked list of the content items of the content type for each of the user identifiers. The transformed historical user FM and the transformed historical content FM are provided as input to the machine learning model and the historical results in the target dataset are used as labels during the training.

In some implementations, generating the historical user FM based on the historical user data may include selecting a subset of user features from the historical user data for inclusion in the historical user FM based at least in part on the recommendation specification. In some implementations, the historical user data includes per user aggregations of interaction events with a website or a software application associated with the recommendation specification.

In some implementations, generating the historical content FM based on the historical content data may include selecting a subset of content features from the historical content data for inclusion in the historical content FM based at least in part on the recommendation specification. In some implementations, selecting the subset of content features for inclusion in the historical content FM based at least in part on the recommendation specification may be based on a correlation value between each content feature and the historical results for the outcome identifier. In these implementations, content features with correlation values below a threshold are excluded from the subset of content features.

In some implementations, training the machine learning model may be performed at periodic intervals. In some implementations, a previous version of the machine learning model is utilized during training.

In some implementations, training the machine learning model may include obtaining a predicted result for the outcome identifier for a plurality of pairs of the content items and the user identifiers and adjusting at least one of the model parameters based on a comparison of the predicted result and the historical result. In some implementations, the training is performed iteratively, and is stopped when improvement in model performance between consecutive iterations falls below an improvement threshold.

In some implementations, the method may further include providing a graphical user interface that enables user selection of the recommendation specification. In some implementations, the method may further include receiving a request for a recommendation, wherein the request includes a user identifier; generating, using the machine learning model, the recommendation that includes one or more recommended content items of the content type; and providing the recommendation in response to the request.

In some implementations, a computer-implemented method includes receiving a recommendation specification that includes a content type and an outcome identifier. The method further includes determining one or more model parameters for a machine learning model based at least in part on the recommendation specification. The method further includes generating a historical user feature matrix (FM) based on historical user data. The method further includes generating a historical content feature matrix (FM) based on historical content data. The method further includes obtaining, using the machine learning model, a plurality of user clusters based on the historical user FM. The method further includes partitioning each user cluster of the plurality of user clusters into two sets based on the historical content FM, wherein a first set includes user identifiers that were associated with a positive result for the outcome identifier for at least one content item of the content type and a second set includes user identifiers that were not associated with the positive result for the outcome identifier in the historical user data. The method further includes, after the partitioning, obtaining a list of content items of the content type for each cluster, wherein the content items in the list are ranked based on a respective score.

In some implementations, obtaining the plurality of user clusters is performed using k-means clustering, k-medians clustering, agglomerative clustering, or spectral clustering. In some implementations, obtaining the list is performed at periodic intervals.

In some implementations, the method further includes, after the partitioning, storing the plurality of user clusters by storing a respective cluster feature vector for each of the plurality of user clusters. In some implementations, the method further includes receiving a request for a recommendation, wherein the request includes a particular user identifier; mapping the particular user identifier to a particular cluster of the plurality of user clusters based on similarity between a user feature vector associated with the particular user identifier and the respective cluster feature vectors for the plurality of clusters; and providing one or more recommended content items from the list of content items of the particular cluster as the recommendation.

In some implementations, a computer-implemented method includes receiving a request for a recommendation of one or more content items of a content type, wherein the request includes a user identifier. The method further includes assigning the user identifier to one of a treatment group or a control group. The method further includes, if the user identifier is assigned to the treatment group, identifying a ranked list of content items of the content type by applying a machine learning model, wherein the user identifier is an input to the machine learning model; and providing one or more content items of the ranked list of content items as the recommendation. The method further includes, if the user identifier is assigned to the control group, selecting a set of content items without use of the machine learning model; and providing one or more content items from the set of content items as the recommendation. The method further includes determining a result of the recommendation based on one or more subsequent user actions.

In some implementations, the request further includes a recommendation context and is an additional input to the machine learning model. In some implementations, the recommendation context may indicate a number of content items and wherein providing one or more content items of the ranked list of content items includes selecting the number of content items from the ranked list of content items.

In some implementations, identifying the ranked list of content items of the content type by applying the machine learning model may include one of: retrieving the ranked list from a database, based on the user identifier, wherein the database stores a respective ranked list of content items for each of a plurality of user identifiers, generated by applying the machine learning model prior to receiving the request; or generating the ranked list by applying the machine learning model after receiving the request.

In some implementations, the method further includes receiving a recommendable set of content items, wherein the recommendable set excludes at least one content item of the content type. In the implementations, applying the machine learning model includes providing the recommendable set of content items to the machine learning model, wherein each content item in the ranked list of content items is included in the recommendable set of content items.

In some implementations, a plurality of requests are received, a corresponding plurality of recommendations are provided, and a respective result is determined for each recommendation, and the method further includes determining a difference between the respective results of the plurality of recommendations for the treatment group and the control group and providing a graphical user interface that illustrates the difference.

Some implementations may include a computing device that includes one or more processors coupled to a memory with instructions stored thereon to perform any of the methods described herein. Some implementations may include a non-transitory computer-readable medium with instructions stored thereon that, when executed by one or more processors, cause the one or more processors to perform any of the methods described herein.

BRIEF DESCRIPTION OF THE DRAWINGS

FIG. 2A is an illustration of an example user feature matrix, according to some implementations.

FIG. 2B is an illustration of an example content feature matrix, according to some implementations.

DETAILED DESCRIPTION

Figure 1:
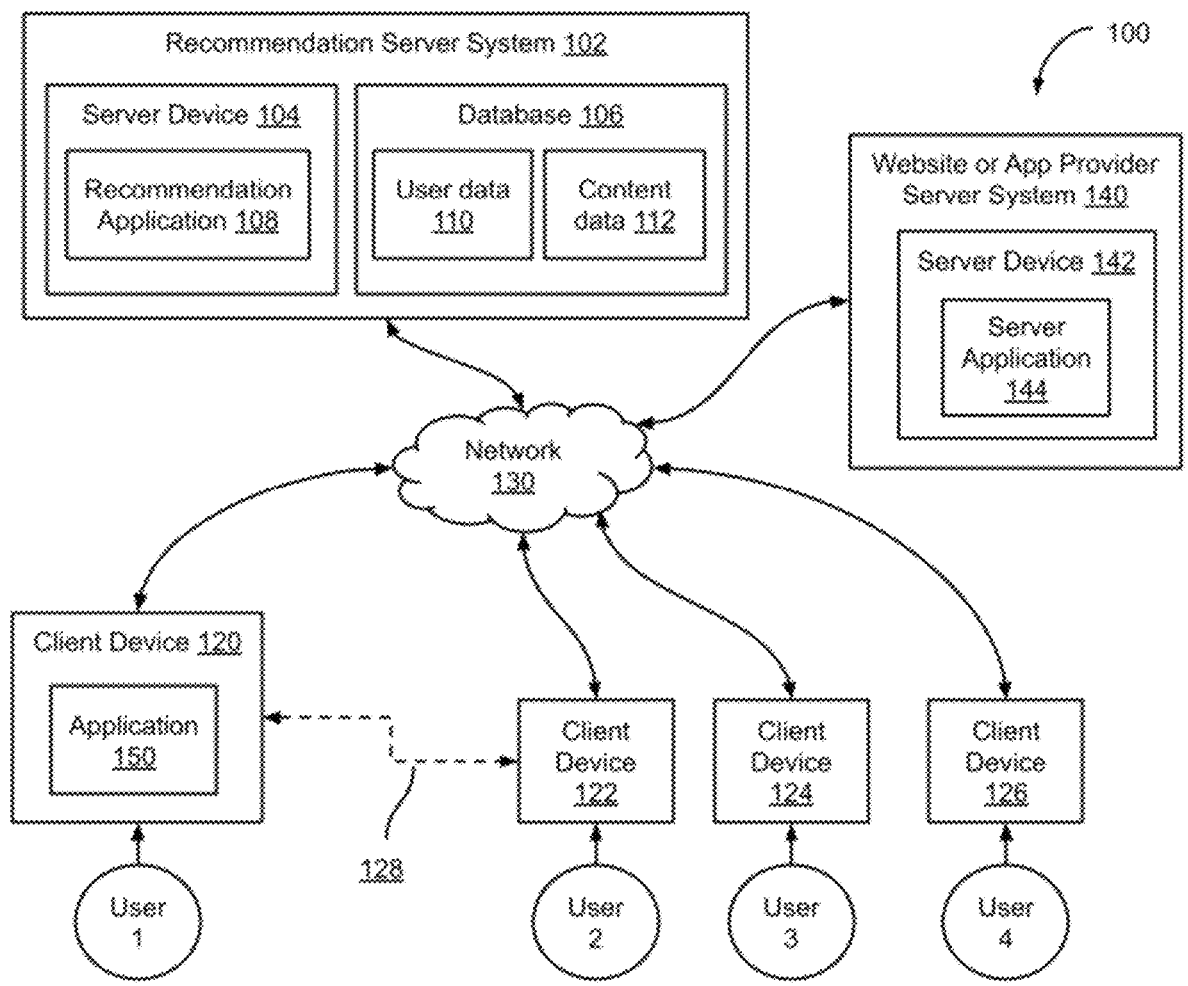
FIG. 1 is a block diagram of an example network environment which may be used for one or more implementations described herein.

This disclosure describes methods, systems, and non-transitory computer-readable media for automated generation of recommendations using machine learning. Data from a customer, including user data and data descriptive of content items, is ingested and automatically transformed into a machine readable format, e.g., a user feature matrix and a content feature matrix. The customer is enabled to provide a recommendation request that specifies a content type (e.g., product IDs) and a target outcome (e.g., purchase, views, etc.). The customer can also specify a recommendable set of content items. ML recommendations models are automatically generated based on the customer request. The ML recommendation models can generate a ranked list of content items (ranked in descending order of predicted likelihood towards the target outcome) which is provided to the customer. The provision of recommendations can be instrumented to include a treatment group and a control group (outcomes for which are tracked). A measurement of expected conversion towards the target outcome due to the provision of the recommendation, as well as a list of top content items for recommendations, is provided to the customer. The described techniques enable quick provision of recommendations, with no custom code deployed by the customer.

Different implementations described herein may utilize user data to generate and provide recommendations, e.g., of content items, to users of a website (e.g., a shopping portal, an entertainment website, a news portal, a social media site, etc.) and/or an application (e.g., a mobile app or a desktop application installed and accessible from a client device, e.g., a media service (e.g., a music, video, or podcast service); a shopping service (e.g., a clothing shopping app, a grocery store app, a restaurant or food ordering app, etc.). The user data of any website and/or app is accessed and utilized per the specific user permissions associated with the website and/or app, and in compliance with applicable laws and regulations.

In some situations, various implementations described herein may be included as part of a website or app by the provider, or may be provided as a third-party service utilized by the provider. In implementations where a third-party provider implements the described techniques, user data of the website or application may be accessed, stored, analyzed, or otherwise utilized by the third-party provider in accordance with user permissions associated with such data.

Users are provided with indications of what type of user data may be collected, stored, and utilized, and the purposes for such collection and storage of user data. Users are provided with options to provide or decline permission for their data, including denying access to certain user data. Provision of the services of the website or app is based on permitted user data; certain features may be turned off or implemented without use of user data, if the user does not provide permission for use of such data.

In various implementations, user data may be processed such that personally identifiable information (PII) is removed. For example, data such as usernames or other identifiable information may be replaced with non-identifiable unique values. In some implementations, user data may be aggregated across multiple users prior to use.

Example Network Environment

FIG. 1 is a block diagram of an example network environment 100 which may be used for one or more implementations described herein.

FIG. 1 illustrates a block diagram of an example network environment 100, which may be used in some implementations described herein. Network environment 100 includes server systems 102 and 140, and client devices 120-126 all coupled via network 130.

Network environment 100 includes one or more server systems, e.g., recommendation server system 102 and website or app provider server system 140 in the example of FIG. 1. Server systems 102 and 140 can communicate with a network 130, for example.

Server system 102 can include a server device 104 and a database 106 or other storage device. In some implementations, server device 104 may provide a recommendation application 108. In some implementations, recommendation application 108 may provide a generic model framework that supports running a plurality of machine learning (ML) models that generate recommendations. Recommendation application 108 may include program code (e.g., software) that provides automated selection of one or more of the ML models, as well as model parameters/hyperparameters to generate recommendations. Recommendation application 108 may enable use of different types of models to generate recommendations and may automatically tune model parameters to improve the generated recommendations.

Server system 140 can include a server device 142, configured to provide one or more applications, e.g., server application 144. For example, server application 144 may provide a website that can be accessed by a client application 150, e.g., a web browser, or may provide server-side functionality for a client application 150 that executes on a client device, e.g., a mobile app, a desktop app, etc.

Client devices 120, 122, 124, and 126 may communicate with each other and/or with server systems 102 and/or 140 via network 130. Network 130 can be any type of communication network, including one or more of the Internet, local area networks (LAN), wireless networks, switch or hub connections, etc. In some implementations, network 130 can include peer-to-peer communication (illustrated by arrow 128) between devices, e.g., using peer-to-peer wireless protocols (e.g., Bluetooth®, Wi-Fi Direct, etc.), etc.

For ease of illustration, FIG. 1 shows one block for recommendation server system 102, server device 104, database 106, website or app provider server system 140, and server device 142, and shows four blocks for client devices 120, 122, 124, and 126. In different implementations, server blocks 102, 104, 106, 140, and 142 may represent multiple systems, server devices, and network databases, and the blocks can be provided in different configurations than shown. For example, server system 102 and/or server system 140 can represent multiple server systems that can communicate with other server systems via the network 130. In some implementations, server system 102 and/or server system 140 can include cloud hosting servers, for example.

In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage (not shown). In some implementations, network environment 100 may not have all of the components shown and/or may have other elements including other types of elements instead of, or in addition to, those described herein.

In various implementations, end-users User 1, User 2, User 3, and User 4 may communicate with server system 102 and/or each other using respective client devices 120, 122, 124, and 126. For example, respective client devices 120, 122, 124, and 126 may communicate data to and from one or more server systems, e.g., system 102 and/or server system 140.

In some implementations, server systems 102 and/or 140 may provide appropriate data to each other and/or to the client devices. For example, recommendation server system 102 may receive user data and content data from server system 140. In some implementations, server system 102 may also receive a recommendable content set from server system 140. In some implementations, server system 102 may also receive a target dataset (that includes data on conversions or outcomes) from server system 140.

In some implementations, any of client devices 120, 122, 124, and/or 126 can provide one or more applications. For example, as shown in FIG. 1, client device 120 may provide an application 150. Client devices 122-126 may also provide similar applications. For example, application 150 may be a browser application configured in communication with a website provider server system 140 and may enable User 1 of client device 120 to access a website provided by server system 140, e.g., a shopping website, a music/video portal, a news website etc. In another example, application 150 may be an application that executes on client device 120 (e.g., a media playback application, a shopping app, etc.) and communicates with server application 144 that provides server-side functionality for application 150. It will be understood that multiple applications 150 may be available on client devices 120-126 and may provide different functionality to the user.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104 and/or server device 142, e.g., application software or client software in communication with server device 104 and/or server device 142. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Example User Feature Matrix

FIG. 2A is an illustration of an example user feature matrix 202, according to some implementations. As seen in FIG. 2A, a user feature matrix may include a plurality of user features with corresponding values for each user. A user may be identified by a user ID (1, 2, 3, . . . in FIG. 2A).

In some implementations, user feature matrix (FM) 202 may include user demographic features. For example, as seen in FIG. 2A, demographic features can include device information (device type, device OS), how the user accesses a service, e.g., provided via server system 140 (using an app or via a website), user location (country), etc. User demographic features can include any suitable user features as permitted by the user. Some examples of user demographic features can include age, gender, city/state/zip code, etc.

In some implementations, user FM 202 may include aggregated features based on user behavior while using client application 150, or accessing a website provided by server system 140 via a browser on a client device. For example, such features can be based on how the user navigates the app or website user interface, e.g., while using a food shopping app, a user searches for "sandwich," taps on "Chicken club sandwich," views "nutritional information," scrolls the app user interface to view the ingredients, taps a back button, and searches for "gyros," and so on. As seen in FIG. 2A, event data generated from such interaction (interaction events) with the app or the website may be aggregated over a time period (e.g., 1 day, 1 week, etc.) to obtain features in the user FM. For example, the columns "tap content week 1" and "tap content week 2" may indicate a count of content items of the food shopping app (e.g., food that can be ordered via the app) that the user tapped on in two consecutive weeks, while "view content week 1" and "view content week 2" may indicate the number of content items that the user viewed in the same week (e.g., viewed for a minimum time period). In some implementations, features in user FM 202 may include any other statistics associated with events of the website or app, e.g., an average count of certain types of events per day (e.g., number of logins, number of page views, etc.,), time since the most recent event of a particular type (e.g., time since items added to cart, time since last order, etc.). Other types of aggregated features based on user behavior can also be included in user FM 202. It will be understood that such aggregated features may be based on the user interaction design of the application 150 (or website) and the mode through which the user interactions with the application 150 (e.g., via touchscreen, mouse, keyboard, voice input, gesture input, etc.)

In some implementations, user FM 202 may also include content interaction behavior related to a particular outcome. For example, the columns "bought sandwich week 1" and "bought soda week 1" indicate whether a particular item ("purchase") was performed with respect to a particular content item (or category of content item), namely "sandwich" and "soda." Other types of features based on content interaction can also be included in user FM 202, e.g., "Played Song 1," "Read news article 1," "watched movie 3," "played Game 4," etc. It will be understood that the features based on content interaction may vary based on the type of content that can be accessed through application 150, and the types of actions that the user can perform with respect to the accessed content via application 150. As seen in FIG. 2A, various features in user FM 202 may have binary values (e.g., TRUE/FALSE), numeric values, string values, or other types of values.

In some implementations, website or application provider server system 140 may provide raw data related to a user's interaction with the website or application 150, and recommendation server system 102 may compute user features and store the computed features in user FM 202. In some implementations, a different system may compute the features and provide the user FM 202 to recommendation server system 102.

Example Content Feature Matrix

FIG. 2B is an illustration of an example content feature matrix 204, according to some implementations. Content feature matrix (FM) 204 may include a plurality of content features, with corresponding values for each content item. For example, as seen in FIG. 2B, content FM 204 includes a plurality of content identifiers (1, 2, 3, . . . ) and values for various content features. Different content items may be associated with different features in content FM 204. As seen in FIG. 2B, various features in content FM 204 may have binary values (e.g., TRUE/FALSE), numeric values, string values, or other types of values.

In some implementations, the website or app provider system 140 may provide content data to recommendation server system 102 which may compute content FM 204. In some implementations, the website or app provider system 140 may compute content FM 204 and provide it to recommendation server system 102.

Example Recommendable Content Set

Figure 3:
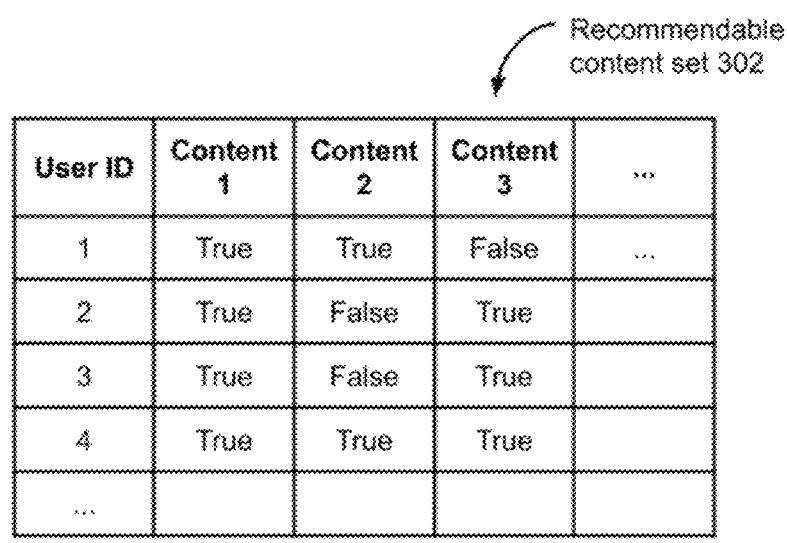
FIG. 3 is an illustration of an example recommendable content set, according to some implementations.

FIG. 3 is an illustration of an example recommendable content set 302, according to some implementations. In some implementations, website or app provider system 140 may provide recommendable content set 302 to recommendation server system 102. For example, an owner or operator of a web site or application hosted by system 140 may identify content items (e.g., from their inventory) for inclusion in recommendable content set 302.

For example, a food shopping app provider may utilize inventory management systems to determine availability of various items, and may only include content items in the recommendable content set 302 that meet a minimum inventory threshold. In another example, a media playback website may determine that certain content items (media items) are unavailable in certain locations, and generate a recommendable content set 302 that only includes permitted content items.

As seen in FIG. 3, in some implementations, recommendable content set 302 may identify content items that are suitable for recommending to individual users, identified by their user IDs. For example, such determination may be based on user data (e.g., location, age, etc.) and may be made by the website or app provider system 140 to generate the recommendable content set 302. In some implementations, the website or app provider system 140 may include in the recommendable content set 302 items that are suitable for promotion, e.g., newly added media items (e.g., "fresh podcast episodes," "new breakfast items,"); items on sale; etc. In various implementations, recommendable content set 302 may include various content items based on criteria chosen by website or app provider system 140. In some implementations, system 140 may provide the criteria for selection to recommendation server system 102 which may perform the generation of recommendable content set 302.

In some implementations, recommendation server system 102 may utilize recommendable content set 302 in the generation of recommendations, as explained further with reference to FIGS. 4-7.

Supervised Learning

Figure 4:
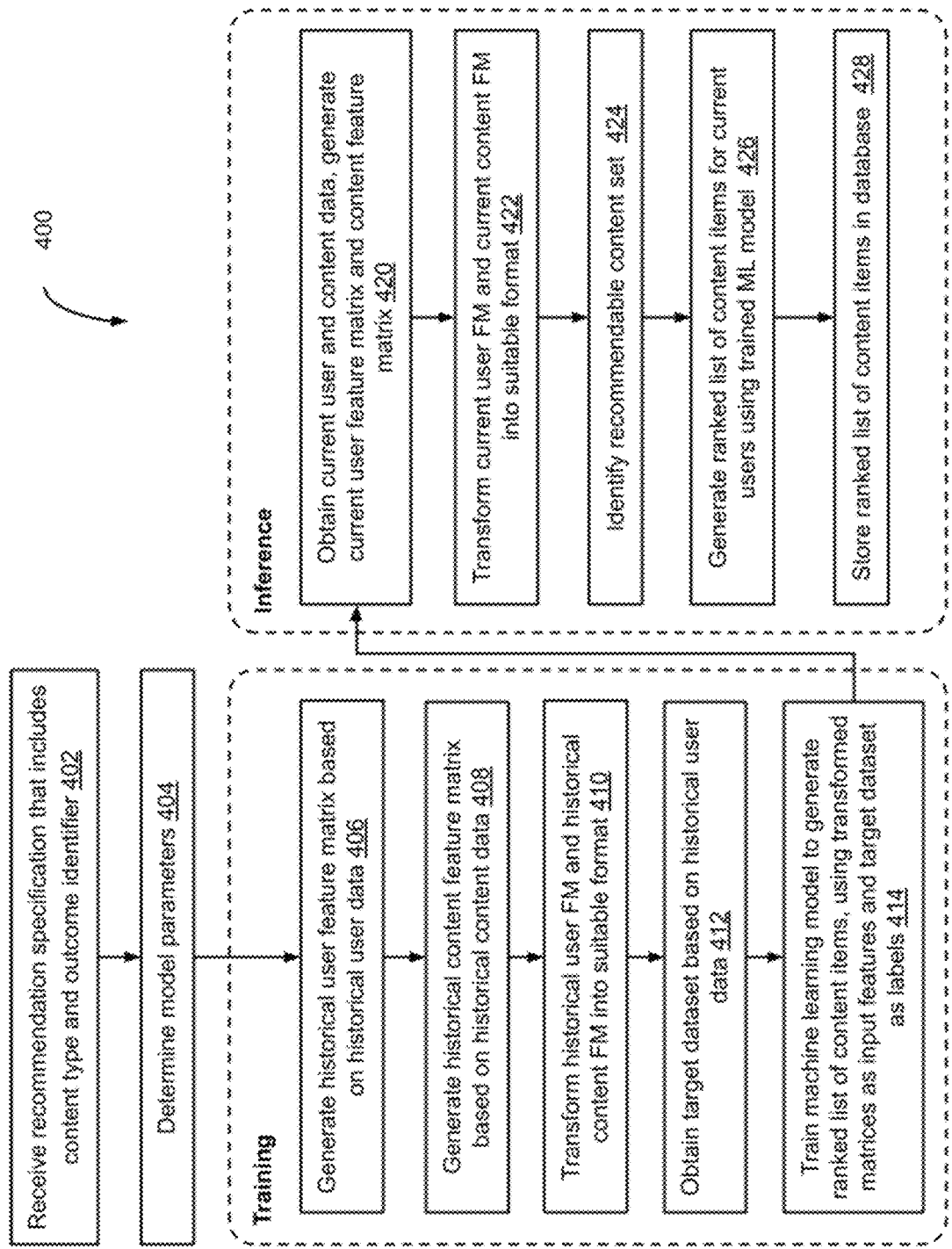
FIG. 4 is a flow diagram illustrating an example method to train and utilize a machine learning model to generate recommendations of content items, according to some implementations.

FIG. 4 is a flow diagram illustrating an example method 400 to train and utilize a machine learning model to generate recommendations of content items, according to some implementations.

Method 400 may begin at block 402. At block 402, a recommendation specification that includes a content type and an outcome identifier is received. For example, the recommendation specification may be received at recommendation server system 102 from website or app provider server system 140.

The content type identified in the recommendation specification may correspond to a particular content type, e.g., a product (content item) available for purchase from the website or app provider server system 140. For example, a recommendation specification for a food ordering app may specify that content items that can be purchased using the food ordering app (e.g., food, beverage) may be included in the recommendation.

The outcome identifier in the recommendation specification may indicate a type of outcome that is to be achieved through provision of a recommendation (of an item of the content type) to a user of the website or app. For example, for a food ordering app, the outcome may be "purchase" (e.g., when the recommendation is provided in a shopping cart context); "view" (e.g., when the recommendation is provided as an advertisement to a user viewing the food ordering app home screen); etc.

Different types of apps and websites may have a corresponding set of content types and outcomes. Recommendation server system 102 may provide an interface, e.g., a graphical user interface (GUI) or an application programming interface (API) that enables website or app providers to provide the recommendation specification. The GUI and/or the API may enable user selection of the recommendation specification (e.g., by an operator or owner of a website or app). Block 402 may be followed by block 404.

At block 404, model parameters are determined. For example, based on the recommendation specification, a type of machine learning (ML) model that generates recommendations may be automatically selected, as well as one or more model parameters/hyperparameters may be selected. In various implementations, the selection of a model as well as model parameters and/or hyperparameters may be based on the recommendation spedfi rad on, the available user features, the available content features, etc. in some implementations, statistics may be collected over a set of users of the website or app, and such statistics may be utilized in selection of the model parameters. In some implementations, the model may be a deep learning model. In some implementations, the model may include neural networks, decision trees, or kernel machines. Block 404 may be followed by block 406.

At block 406, a historical user feature matrix (FM) is generated. For example, the historical user FM may be generated based on historical user data provided by server system 140. In some implementations, historical user data may be user data up to a previous week from a time at which method 400 is performed. An example user FM is shown in FIG. 2A above. In some implementations, generating the historical user FM may include selecting a subset of user features from the historical user data for inclusion in the historical user FM based at least in part on the recommendation specification. In some implementations, the historical user data may include per user aggregations of interaction events with a website or a software application associated with the recommendation specification, e.g., received from server system 140 and associated with server application 144. Block 406 may be followed by block 408.

At block 408, a historical content feature matrix (FM) is generated. For example, the historical content FM may be generated based on content data provided by server system 140. In some implementations, historical content data may be content data up to a previous week from a time at which method 400 is performed. An example content FM is shown in FIG. 2B above. In some implementations, generating the historical content FM may include selecting a subset of content features from the historical user data for inclusion in the historical content FM based at least in part on the recommendation specification.

For example, in some implementations, a correlation value between each content feature and the historical results for the outcome identifier may be calculated. In these implementations, content features with correlation values below a threshold may be excluded from the subset of content features in the historical content FM. Block 408 may be followed by block 410.

At block 410, the historical user FM and/or the historical content FM may be transformed into a format suitable for the selected ML model. For example, while FIGS. 2A and 2B each show a columnar representation, it will be understood that different ML models may accept inputs in different ways. For example, if the user FM and/or the content FM is a sparse matrix, a format that compresses the data may be used. In some implementations, the transformation may include generation of a feature vector or an embedding based on the historical user FM and/or historical content FM. Block 410 may be followed by block 412.

At block 412, a target dataset is obtained based on historical user data. The target dataset may include historical results for the outcome identifier for a plurality of pairs of user identifiers and content items of the content type.

Figure 5:
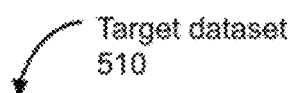
FIG. 5 is an illustration of an example target dataset, according to some implementations.

An example of a target dataset 510 is shown in FIG. 5. As seen in FIG. 5, in some implementations, the target dataset may include a plurality of pairs of user identifiers and content identifiers, and a field that indicates the historical result for the user identified by the user identifier with reference to the content identifier, where the historical result indicates whether the outcome identified by the outcome identifier (e.g., "purchase," "view," etc.) was achieved (Converted="TRUE") or not achieved (Converted="FALSE") in the user's past interactions, as indicated in historical user data. The content items in the target dataset may be of the content type identified in the recommendation specification. Block 412 may be followed by block 414.

At block 414, the ML model is trained using supervised learning to generate a ranked list of content items of the content type for each of the user identifiers. During the training, the transformed historical user FM and the transformed historical content FM are provided as input to the machine learning model and the historical results in the target dataset are used as labels.

In some implementations, training the ML model may include obtaining a predicted result from the ML model for the outcome identifier for a plurality of pairs of content items and user identifiers. A comparison of the predicted result and the historical result may be performed, and one or more of the model parameters may be based on the comparison. For example, a weight of one or more nodes of a neural network may be adjusted (when the ML model is implemented as a neural network).

For example, for training, the transformed historical user FM and historical content FM along with corresponding historical results (which serve as labels) may be partitioned into a training set and a test set. The training set is provided to the ML model in the training process and predicted results are obtained from the ML model under training. The training is performed such that the model learns parameters that lead to the predicted results and the historical results match. Differences between the predicted results from the model under training and the historical results may be used as training input to adjust the model parameters.

Upon adjustment of the parameter, the feature matrices from the test set (but not the labels) may be provided to the model and predicted results for the test set may be obtained. The predicted results may be compared with ground truth historical results from the target dataset to determine the model accuracy. In some implementations, training may be performed iteratively until the improvement in model performance (e.g., accuracy) between consecutive iterations falls below an improvement threshold.

In some implementations, training the ML model may be performed at periodic intervals (e.g., once an hour, once a day, etc.). In these implementations, a previous version of the ML model may be utilized during training, e.g., to initialize model parameters, and incremental training may be performed. In some implementations, model training may be performed upon certain conditions. For example, it may be detected that the model performance has fallen below a performance threshold may be detected (e.g., generated recommendations not resulting in the result from the outcome identifier when provided via the website or application), and model training may be triggered in response. In some implementations, model training may be triggered based on changes to the content set (e.g., when new content items are added to the content data), changes in the user population (e.g., when the website or app adds new users), or on-demand by a website or app provider.

In some implementations, the ML model may generate a ranked list of content items of the content type for each user. For example, the content items in the list may be ranked based on the likelihood of the predicted result for the outcome identifier being TRUE (e.g., "Purchase made," "item viewed," etc.) Block 414 may be followed by block 420.

Blocks 406-414 may be referred to collectively as a "training stage" for the ML model. Blocks 406-414 may be performed at periodic intervals to retrain or update the ML model. In some implementations, one or more previous versions (e.g., a model version from the immediate preceding interval, or other intervals) of the machine learning model is utilized during the training. In these implementations, model parameters of the previous version may be used, e.g., during selection of model parameters (block 404), to warm start or initialize the model. In some implementations, a plurality of models may be trained based on the recommendation specification, and blocks 406-414 may be performed for each model that is trained.

At block 420, current user data and content data may be obtained. For example, current user data may include user data including data from the current week (at the time when method 400 is performed). Similarly, current content data may include content data from the current week. In some implementations, current user data may also include historical user data (e.g., from one or more prior weeks) and current content data may also include historical content data (e.g., from one or more prior weeks) in addition data from the current week. The current user data and content data may be utilized to generate a current user FM and a current content FM, e.g., similar to blocks 406 and 508 respectively. Block 420 may be followed by block 422.

At block 422, the current user FM and current content FM may be transformed into a suitable format for the ML model, e.g., similar to block 410. Block 422 may be followed by block 424.

At block 424, a recommendable content set may be identified. An example of a recommendable content set is shown in FIG. 3. In some implementations, the recommendable content set may include all content items in the current content data (e.g., when no items are excluded). In some implementations, block 424 may not be performed and all content items may be included in the recommendable content set as a default. Block 424 may be followed by block 426.

At block 426, a ranked list of content items may be generated for current users (in the current user data) using the trained ML model. In some implementations, the model may generate a set of content items and associated scores, and the scores may be used to generate the ranked list. In some implementations, the ranked list of content items may be generated based on one or more other parameters. For example, after the scores are generated, the ranked list of content items may be generated with specific subsets of items having a higher likelihood of inclusion in the ranked list of content items. For example, if a recommendable content set is received, it may be utilized during the post-processing to generate the ranked list. Block 426 may be followed by block 428.

At block 428, the generated ranked list of content items for each user may optionally be stored in a database (e.g., database 106). In the implementations where the ranked list is stored in a database, the database may support queries for recommendations, e.g., that request one or more recommended content items for a particular user identifier. Storing a respective ranked list of content items for current users in the database may enable on-demand provision of recommendations (that include recommended content items) in response to requests for recommendations received from server system 140. Further, this can allow batch-mode generation of the ranked lists using the ML model. Batch-mode generation can allow fast responses to requests for recommendations (since the recommendations are a database lookup). In some implementations, blocks 420-428 may be performed periodically, e.g., once per hour to generate and store ranked lists of content items for current users corresponding to that period. The recommendation that includes one or more recommended content items for the particular user identifier is provided in response to the request for the recommendation.

In some implementations, block 428 may not be performed, and instead, recommendations may be generated on-demand. For example, a request for a recommendation that includes a particular user identifier may be received. A ranked list of content items of the content type may be obtained for the particular user identifier by utilizing the trained ML model (which may receive the user identifier as input). A recommendation may be generated that includes one or more recommended content items from the ranked list. On-demand generation may be suitable in certain situations, e.g., when the total population of current users is large, but requests are received only for a subset of the current users. In this case, on-demand generation can save computational cost by performing the generation of ranked list (block 426) specifically for the subset of current users. The recommendation that includes one or more recommended content items for the particular user identifier is provided in response to the request for the recommendation.

In some implementations, the recommendable content set may be provided as an input to the trained ML model and may serve as a constraint (e.g., content items that are not in the recommendable content set may automatically be excluded from the ranked list). In some implementations, the recommendable content set may be used to filter the ranked list of content items generated by the trained ML model prior to being included in the recommendation.

Blocks 420-428 may be referred to collectively as an "inference stage" for the ML model. The blocks may performed to obtain a recommended set of content items for one or more user identifiers using a trained machine learning model (e.g., trained using training blocks 406-414).

While FIG. 4 shows blocks 402-428 in a particular sequence, it will be understood that in various implementations, the blocks may be combined, split into multiple blocks, and/or performed in a different order than that of FIG. 4. For example, any of blocks 408, 410, and 412 may be performed in parallel, or in a different order than shown. In some implementations, the blocks of the training stage (blocks 406-414) may be performed to train a new version of the machine learning model, while blocks of the inference stage (blocks 420-428) may performed at the same time to generate and store ranked lists using a previous version of the machine learning model. The training stage of method 400 may be repeated with different inputs, e.g., different recommendation specifications, to automate the training of a machine learning model to generate recommendations, and the trained machine learning models thus obtained may be utilized to provide ranked lists for various content types and/or outcome identifiers, as specified in the different recommendation specifications.

Clustering

Figure 6:
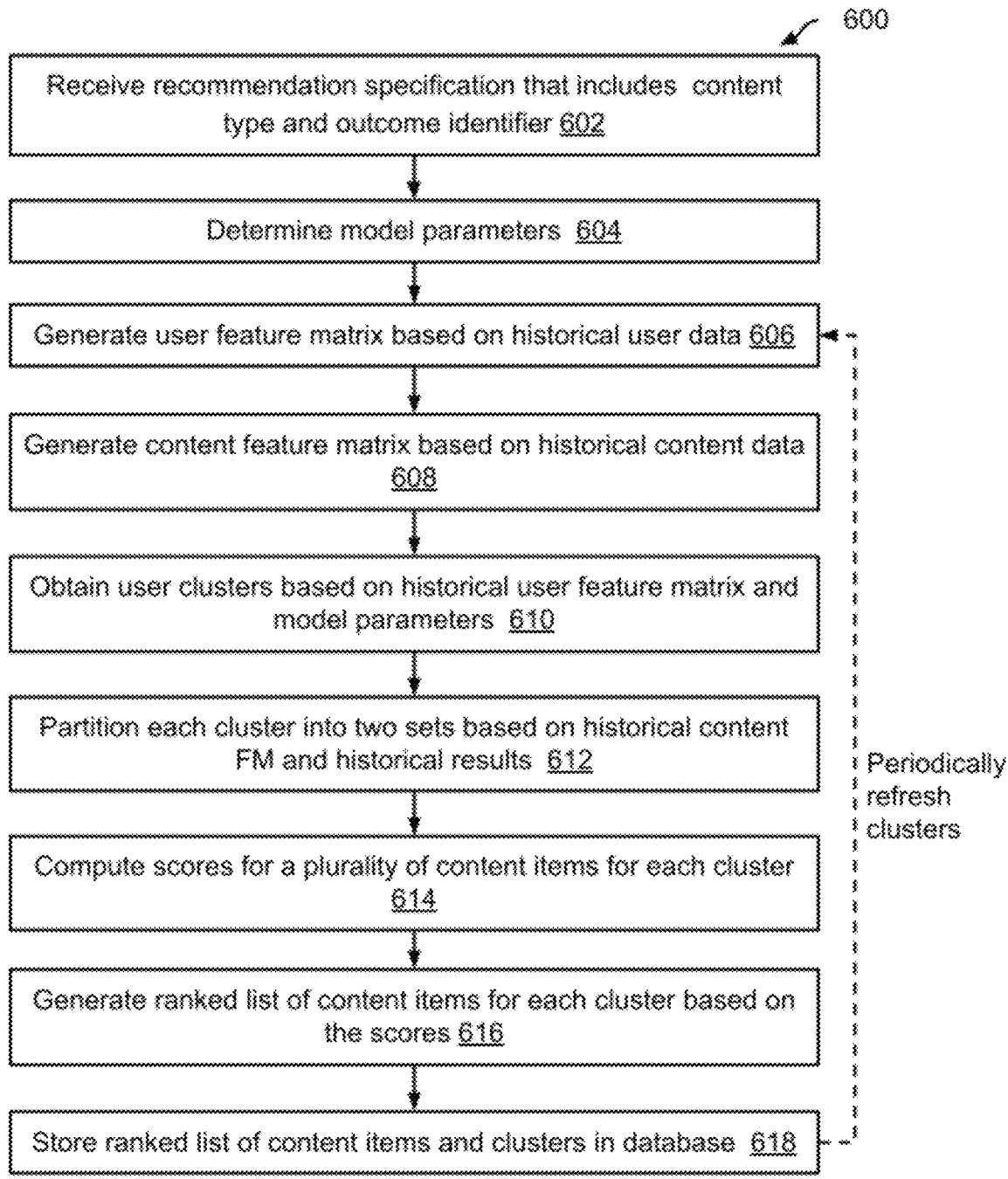
FIG. 6 is a flow diagram illustrating an example method to generate recommendations of content items using a machine learning model, according to some implementations.

FIG. 6 is a flow diagram illustrating an example method 600 to generate recommendations of content items using a machine learning model, according to some implementations.

Method 600 may begin at block 602. At block 602, a recommendation specification that includes a content type and an outcome identifier is received. The operations in block 602 are similar to block 402 of FIG. 4. Block 602 may be followed by block 604.

At block 604, model parameters are determined. The operations in block 604 are similar to block 404 of FIG. 4. Block 604 may be followed by block 606.

At block 606, a historical user feature matrix (FM) is generated. The operations in block 606 are similar to block 406 of FIG. 4. Block 606 may be followed by block 608.

At block 608, a historical content feature matrix (FM) is generated. The operations in block 608 are similar to block 408 of FIG. 4. Block 608 may be followed by block 610.

At block 610, user clusters are obtained based on the historical user FM and the model parameters. In some implementations, k-means clustering may be used to obtain user clusters. In different implementations, other clustering techniques such as k-medians clustering, agglomerative clustering, or spectral clustering (or related clustering techniques) may be used to obtain the user clusters. In some implementations, the user clusters may be obtained by determining a respective user feature vector based on the historical user FM and applying a clustering technique to the user feature vectors. Block 610 may be followed by block 612.

At block 612, each cluster is partitioned into two sets based on the historical content FM and historical results. For example, historical results may indicate whether a particular user was associated with a positive result for the outcome identifier for at least one content item of the content type in the historical data or was not associated with a positive result for the outcome identifier, determined based on the historical user data. In some implementations, a target dataset (e.g., similar to that of FIG. 5) may be utilized to determine whether a user identifier was associated with a positive result.

In some implementations, after the partitioning, the plurality of user clusters may be stored. In some implementations, storing the plurality of user clusters may include storing a respective cluster feature vector for each of the plurality of user clusters. Block 612 may be followed by block 614.

At block 614, respective scores are computed for a plurality of content items for each cluster. Each score is based on the likelihood associated with provision of the content item as a recommendation producing a positive result for the outcome identifier. The likelihood determination (performed on a per cluster basis) takes into account the user features for each cluster. In some implementations, a respective score may be computed for each user of the plurality of users that are part of a cluster. Block 616 may be followed by block 616.

At block 616, a list of content items of the content type is obtained for each cluster. Content items in the list are ranked based on respective scores. In the implementations where per-user scores are computed, a ranked list may be obtained for each user. Block 616 may be followed by block 618. In some implementations, block 616 may be performed at periodic intervals, e.g., once per hour.

At block 618, the ranked list of content items and clusters (e.g., a cluster feature vector for each cluster) may be stored in a database, e.g., database 106.

In some implementations, the clusters may be periodically refreshed, e.g., once an hour, once a day, once a week, etc. In these implementations, block 618 may be followed by block 606, with an iteration of blocks 606-616 being performed at the periodical interval.

In some implementations, method 600 may further include receiving a request for a recommendation of content of the content type. The request may include a particular user identifier. In these implementations, method 600 may further include mapping the particular user identifier to a particular cluster of the plurality of user clusters based on similarity between a user feature vector associated with the particular user identifier (e.g., determined based on current user data) and the respective cluster feature vectors for the plurality of clusters (e.g., as stored in the database). The mapping may be performed such that the particular user identifier is associated with a particular cluster that has a cluster feature vector that is most similar to the user feature vector. In these implementations, method 600 may further include providing one or more recommended content items from the list of content items of the particular cluster as the recommendation. In the implementations where a ranked list is generated per user per cluster, one or more content items from the list of content items for the particular user of the particular cluster may be provided as the recommendation.

While FIG. 6 shows blocks 602-618 in a particular sequence, it will be understood that in various implementations, the blocks may be combined, split into multiple blocks, and/or performed in a different order than that of FIG. 6. For example, any of blocks 606 and 608 may be combined or performed in parallel. Method 600 may be repeated with different inputs, e.g., different recommendation specifications to provide ranked lists for various content types and/or outcome identifiers, as specified in the different recommendation specifications.

Providing Recommendations and Measuring Results

Figure 7:
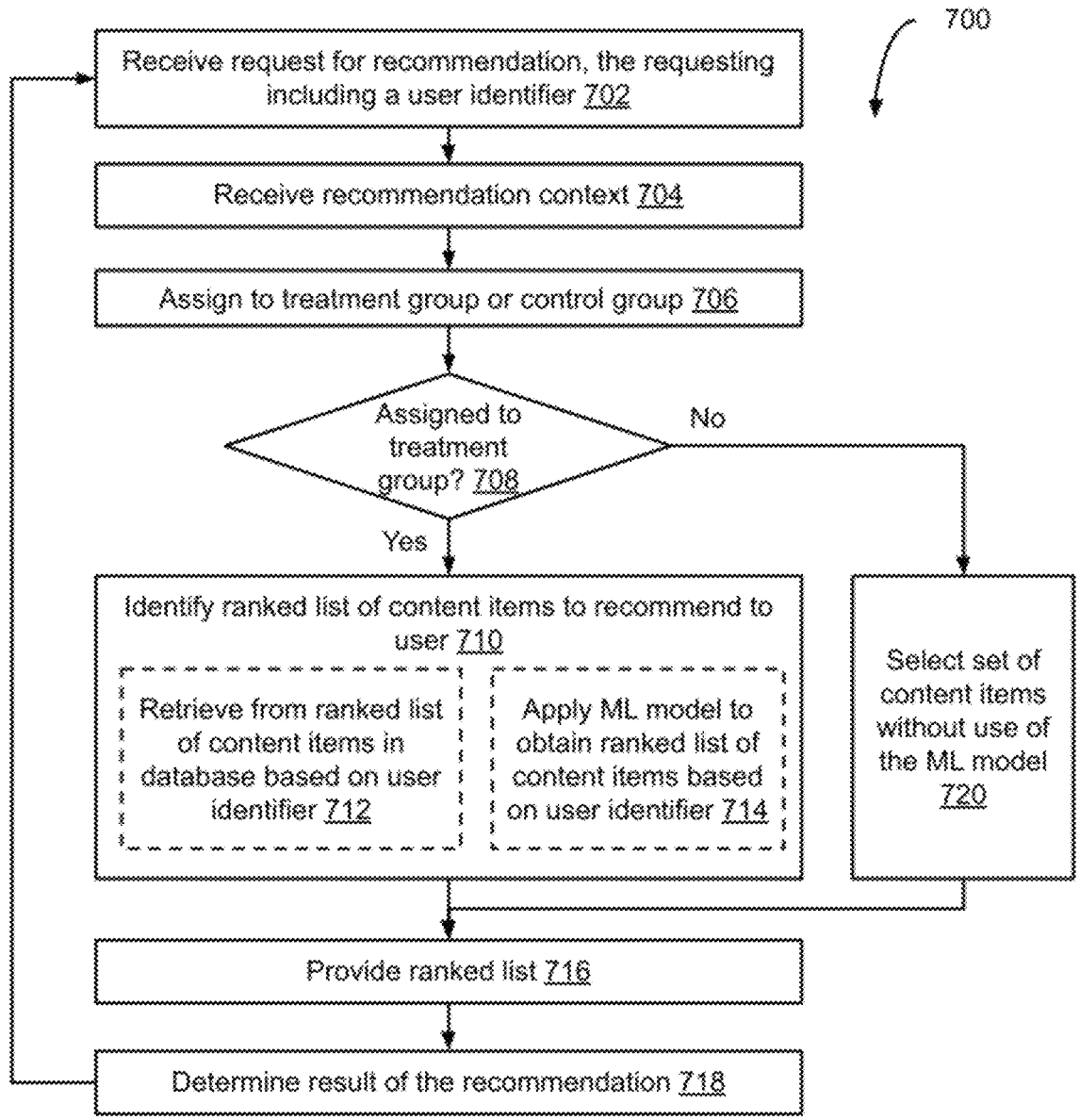
FIG. 7 is a flow diagram illustrating an example method to provide a rank list of content items in response to a request for a recommendation, according to some implementations.

FIG. 7 is a flow diagram illustrating an example method 700 to provide a rank list of content items in response to a request for a recommendation, according to some implementations.

Method 700 may begin at block 702. At block 702, a request for a recommendation of one or more content items of a content type is received. The request may include a user identifier. For example, the request may be received from website or app server system 104 that serves as a backend for client application 150, or that provides a website that is accessed via client application 150. Block 702 may be followed by block 704.

At block 704, a recommendation context is received. In some implementations, the recommendation context may be received as part of the request for recommendation. In these implementations, the recommendation context may serve as an additional input to a machine learning model, explained with reference to block 710 below. In some implementations, the recommendation context indicates a number of content items, e.g., to be included in the recommendation. For example, if a shopping website includes three slots in the user interface for recommendations (e.g., during checkout), the recommendation context may indicate that three content items are to be included in the recommendation. Block 704 may be omitted in implementations where no recommendation context is utilized. Block 704 may be followed by block 706.

At block 706, the recommendation request is assigned to one of a treatment group or a control group. Assigning the request to a particular group in this manner can enable measurement of the conversion lift (improvement/change in outcomes) produced by the recommendation, when provided to the user via a user interface of the application or web site that requests the recommendation. Block 706 may be followed by block 708.

At block 708, it is determined whether the request for recommendation is assigned to the treatment group. If the request for recommendation is assigned to a treatment group, block 708 is followed by block 710, else block 708 is followed by block 720.

At block 710, a ranked list of content items of the content type is identified. In the implementations in which a database is used to store ranked lists of content items for a plurality of users (current users) or clusters (e.g., as explained with reference to block 428 of FIG. 4 and block 618 of FIG. 6), the ranked list of content items is retrieved from the database based on the user identifier, illustrated as block 712 (shown in dotted lines). In the implementations where such a database is not stored, or when recommendations for the user identifier are not available in the database (e.g., a new user, or a user for whom no recommendation was previously generated), a machine learning model (e.g., obtained using methods described with reference to FIG. 4 or FIG. 6) is applied (on-demand mode) to obtain the ranked list of content items, illustrated as block 714 (shown in dotted lines). The user identifier in the request is provided as an input to the machine learning model, e.g., the trained ML model of FIG. 4 or the clustering model of FIG. 6.

In the implementations where a recommendation context is received, the recommendation context is provided as an additional input to the trained machine learning model. It will be understood that irrespective of whether block 712 or block 714 is performed, the ranked list of content items is identified by applying the machine learning model, with block 712 corresponding to batch mode (with ranked lists being cached in a database) and block 714 corresponding to an on-demand mode. Block 710 may be followed by block 716.

If at block 708 it is determined that the request for recommendation is assigned to the control group, block 720 is executed to select a set of content items without use of the ML model of FIG. 4 or FIG. 6. For example, a random set of content items may be selected. In some implementations, e.g., when there are multiple ML models or other recommendation algorithms implemented, the "treatment group" may correspond to a current generation ML model and the control group may correspond to an alternative model or recommendation algorithm, e.g., that is under test, and the set of content items may be selected using the alternative model or recommendation algorithm. Block 720 may be followed by block 716.

In some implementations, method 700 may further include receiving a recommendable set of content items. The recommendable set of content items may exclude one or more content items of the content type. In these implementations, each of blocks 710 (with either database retrieval of block 712 or application of ML model of block 714) and block 720 is implemented such that the ranked list includes only items that are in the recommendable set of content items. In implementations in which the ML model is applied (block 714) to generate the ranked list, method 700 may include providing the recommendable set of content items as an input to the machine learning model, such that each content item in the ranked list of content items generated by the machine learning model is included in the recommendable set of content items. In implementations in which the ranked list is retrieved from a database (block 712), the ranked list may be filtered to remove content items that are not in the recommendable content set, prior to performing block 716.

At block 716, one or more of the ranked list of content items are provided in response to the request. For example, if the recommendation context indicates that two content items are to be provided, the top two content items in the ranked list may be provided. In the implementations where the recommendation context indicates the number of content items to be provided, providing one or more of the ranked list of content items includes selecting the number of content items from the ranked list of content items. Block 716 may be followed by block 718.

At block 718, the result of the recommendation is determined based on one or more subsequent user actions. For example, in a shopping application where the recommendation is provided as a suggested item, the subsequent user actions may include "added to wish list," "added to cart," "purchased," or "not selected." Such user actions may be included in subsequent user data.

If the user that received the recommendation via the shopping application does not select the recommendation, the result may be determined as a negative result. If the user that received performs one of the other actions (adding to wish list or cart, completing a purchase of at least one content item in the recommendation), the result may be determined as a positive result.

In some implementations, a plurality of requests for recommendation may be received and a corresponding plurality of recommendations may be provided. In these implementations, a respective result may be determined for each recommendation. In these implementations, method 700 may further include determining a difference between the respective results of the recommendations for the treatment group and the control group and providing a graphical user interface that illustrates the difference. For example, if the treatment group is associated with a higher proportion of positive results than the control group, the difference may be determined and illustrated in the graphical user interface. The difference may be referred to as conversion lift and may serve as a measure of the value of the recommendation service provided by the recommendation server system 102.

Block 718 may be followed by block 702 to receive further requests for recommendations.

Example Graphical User Interface

Figure 8:
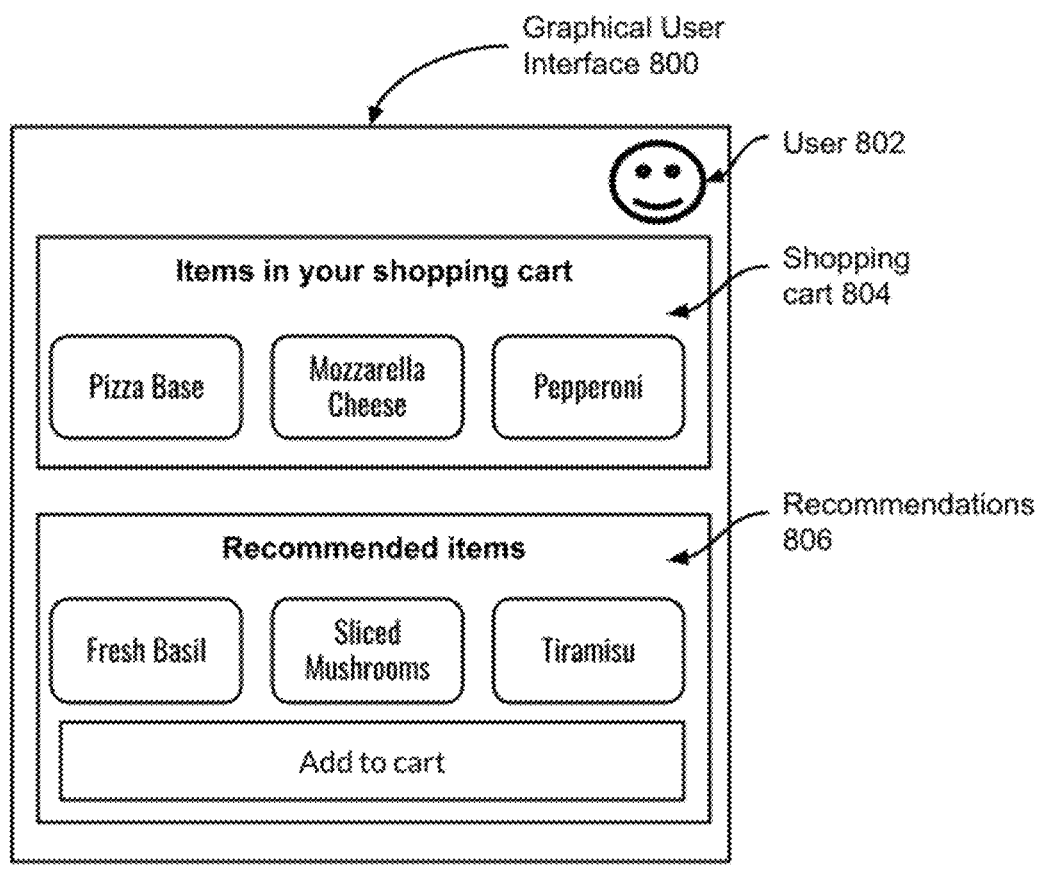
FIG. 8 is an example of a graphical user interface that includes recommended content items, according to some implementations

FIG. 8 is an example of a graphical user interface (GUI) 800 for a food shopping application, according to some implementations. In the example of FIG. 8, GUI 800 includes a shopping cart section 804 and a recommended items section 806. A user 802 of the food shopping application has added three items to their shopping cart—pizza base, mozzarella cheese, and pepperoni. The food shopping application sends a request for recommendation to recommendation server system 102, e.g., that includes ML models trained to generate a ranked list of content items based on a recommendation specification from the food shopping application. In response, the recommendation server system 102 generates a ranked list of content items, which are provided in the recommendations section 806—fresh basil, sliced mushrooms, and tiramisu, along with an option to add these items to the shopping cart.

As described previously, the food shopping application may generate and record (with user permission) user data based on the user's interaction with the application, e.g., items that the user searches for, items that the user views/adds to cart/adds to wishlist, purchases made by the user, the user's navigation patterns within the application, etc. Such user data is provided (with user permission) to the recommendation server system 102 which may utilize the data to train recommendation models (as explained with reference to FIGS. 4 and 6) and to generate recommendations.

Example Graphical User Interface

Figure 9:
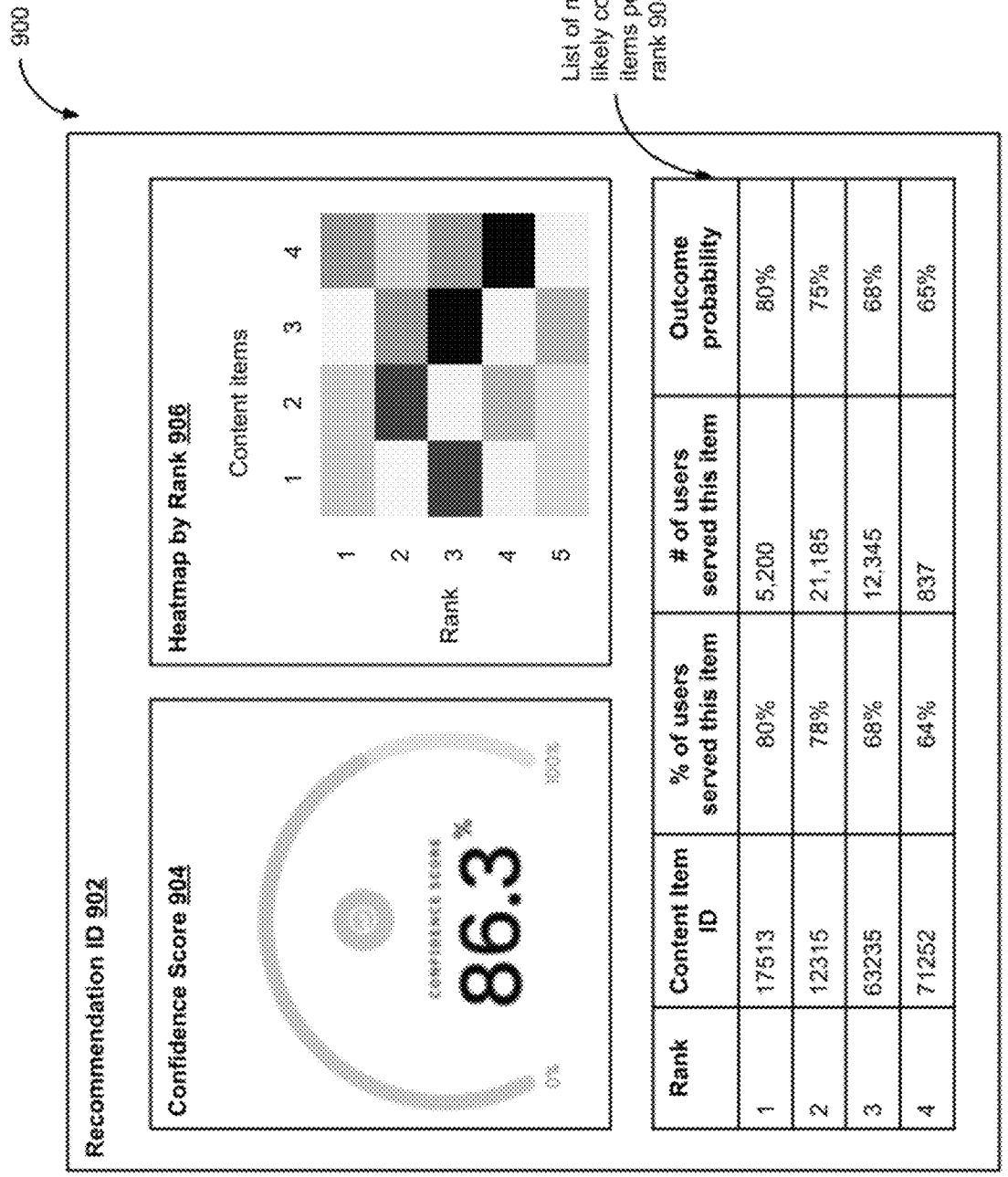
FIG. 9 is an example of a graphical user interface, according to some implementations

FIG. 9 is an example of a graphical user interface 900, according to some implementations. In some implementations, a graphical user interface or other interface (e.g., an API) may be provided, e.g., to an owner, operator, or other user associated with the provider of the web site or app provider server system 140, that provides the recommendation specification. In some implementations, the user interface may provide various estimated parameters associated with the recommendation specification.

The graphical user interface may be provided for a particular recommendation ID, e.g., recommendation ID 902, that corresponds to a particular recommendation specification. Upon determination of the ranked list of content items, a confidence score may be determined for the particular recommendation specification. The confidence score (e.g., a % value between 0-100) may be an indication of the quality of recommendations generated for the recommendation specification. An example of a visualization of confidence score (904) is shown in FIG. 9. A higher confidence score (e.g., 86%) may indicate that provision of the recommendations is associated with a higher proportion of users to whom the recommendations are provided performed the outcome associated with the outcome identifier than users to whom the recommendation is not provided or the users that are included in the control group (as described with reference to FIG. 7).

In some implementations, the graphical user interface may also include a heatmap (906) that illustrates content items against ranks, providing an indication of the number of users for whom each content item appears at different positions in the ranked lists, across the population of users.

In some implementations, the graphical user interface may also include a list of the most likely content items per rank (908) across the user population. For example, for a food ordering app, the most likely content items may correspond to items that are included at the corresponding rank, e.g., "Rank 1=Bottled water," "Rank 2=Potato chips," etc. While content items are referred to by name for simplicity, it will be understood that the content identifier may specifically identify the content item, e.g., by a product stock keeping unit (SKU) or other unique identifier.

In some implementations, the list may also indicate the percentage of users to whom the content item is recommended, a number of such users, and an estimated likelihood that the user performs the outcome associated with the outcome identifier upon receiving the recommendation. List 908 illustrates these fields. The provision of the most likely content items and the additional information for content items of ranks can serve as a predicted performance of the recommendation and may enable to the app or website provider to take various actions, e.g., modify the recommendable set of content items (e.g., if certain content items are likely to become unavailable).

Example Computing Device

Figure 10:
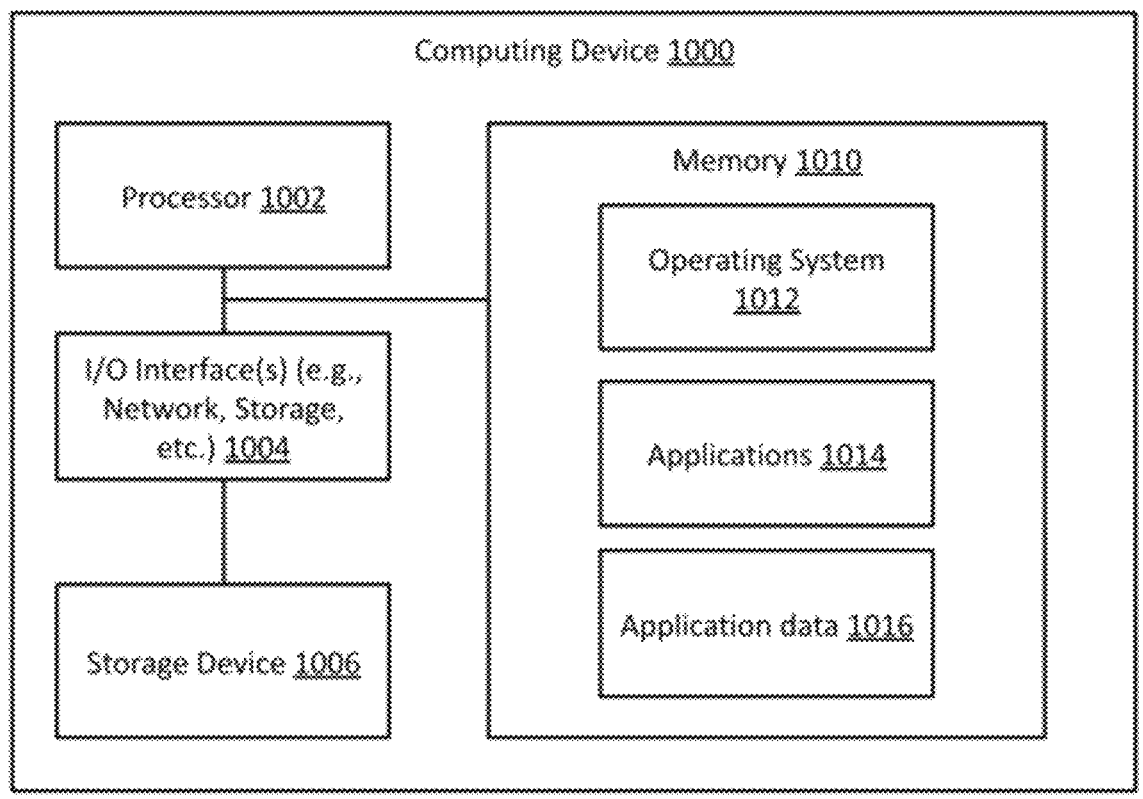
FIG. 10 is a block diagram of an example computing device which may be used to implement one or more features described herein.

FIG. 10 is a block diagram of an example computing device 1000 which may be used to implement one or more features described herein. In one example, device 1000 may be used to implement a computer device, e.g., any of deployment server systems 102 or 140, server devices 104 or 142, client devices 120-126, etc., and perform various method implementations described herein.

Device 1000 can be any suitable computer system, server, or other electronic or hardware device. For example, the device 1000 can be a mainframe computer, server computer, desktop computer, workstation, portable computer, etc. In some implementations, device 1000 includes a processor 1002, input/output (I/O) interface(s) 1004, one or more storage devices 1006, and a memory 1010.

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1010 is provided in device 1000 for access by the processor 602 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith.

Memory 1010 can store software operating on device 1000 by the processor 1002, including an operating system 1012, one or more applications 1014 (e.g., including a recommendation application 108; a server application 144 that sends a recommendation specification or a request for recommendation and receives recommendations that identify one or more content items; client application 150 such as a mobile app that displays recommendations of content items or a web browser application that displays websites that include recommendations of content items, etc.), and application data 1016 (e.g., including user data 110 and/or content data 112, including current period and historical data; one or more trained machine learning models; one or more target datasets; one or more ranked lists of content items; one or more user clusters and/or cluster feature vectors; etc.). In some implementations, applications 1014 can include instructions that enable processor 1002 to perform the functions described herein, e.g., some or all of the methods of any of FIG. 4, 6, or 7, and display a user interface, e.g., the user interface of FIG. 8 or 9.

Any of software in memory 1010 can alternatively be stored on any other suitable storage location or computer-readable medium. In addition, memory 1010 (and/or another connected storage device(s)) can store other instructions and data used in the features described herein. Memory 610 and any other type of storage (magnetic disk, optical disk, magnetic tape, or other tangible media) can be considered "storage" or "storage devices."

I/O interface 1004 can provide functions to enable interfacing the computing device 1000 with other systems and devices. For example, network communication devices, external storage devices, and other input/output devices can communicate via interface 1004. In some implementations, the I/O interface 1004 can connect to interface devices including input devices (keyboard, pointing device, touchscreen, microphone, camera, scanner, etc.) and/or output devices (display device, speaker devices, printer, motor, etc.).

Storage device 1006 may be of any type, e.g., a solid-state storage device, a hard disk drive, etc. that can be used by operating system 1012 and/or one or more applications 1014. Storage device 1006 may be a direct-attached storage device, e.g., coupled to processor 1002 and directly controlled by processor 1002, or a network-attached storage device, e.g., accessed by processor 1002 via a network interface. Processor 1002 is coupled to I/O interface(s) 1004, storage device 1006, and memory 1010 via local connections (e.g., a PCI bus, or another type of local interface) and/or via networked connections.

For ease of illustration, FIG. 10 shows one block for each of processor 1002, I/O interface 1004, storage device 1006, and memory 1010 with software blocks 1012, 1014, and 1016. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. Any suitable component or combination of components of server system 102 or server system 140, or similar system, or any suitable processor or processors associated with such a system, may perform the operations described, e.g., with reference to any of FIG. 4, 6, or 7.

A user device can also implement and/or be used with features described herein. Example user devices can be computer devices including some similar components as the computing device 1000. An operating system, software, and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices.

One or more methods described herein (e.g., method 400, 600, or 700) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc.

The program instructions can also be contained in, and provided as an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (or GPUs) Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run in a web browser, a server application that executes on a single computer, a distributed application that executes on multiple computers, etc. In one example, a client/server architecture can be used, e.g., a mobile computing device (as a client device) sends user input data to a server device and receives from the server the final output data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method comprising:
    receiving a recommendation specification, by a machine learning model, that includes a content type and an outcome identifier;
    determining one or more model parameters for the machine learning model based at least in part on the recommendation specification;
    generating a historical user feature matrix (FM) based on historical user data;
    generating a historical content feature matrix (FM) based on historical content data;
    transforming the historical user FM and the historical content FM into a suitable format for the machine learning model;
    obtaining a target dataset based on the historical user data, wherein the target dataset includes historical results for the outcome identifier for a plurality of pairs of user identifiers and content items of the content type; and
    training the machine learning model using supervised learning to generate a ranked list of the content items of the content type for each of the user identifiers, wherein the transformed historical user FM and the transformed historical content FM are provided as input to the machine learning model and the historical results in the target dataset are used as labels during the training.

2. The computer-implemented method of claim 1, wherein generating the historical user FM based on the historical user data comprises selecting a subset of user features from the historical user data for inclusion in the historical user FM based at least in part on the recommendation specification.

3. The computer-implemented method of claim 1, wherein generating the historical content FM based on the historical content data comprises selecting a subset of content features from the historical content data for inclusion in the historical content FM based at least in part on the recommendation specification.

4. The computer-implemented method of claim 3, wherein selecting the subset of content features for inclusion in the historical content FM based at least in part on the recommendation specification is based on a correlation value between each content feature and the historical results for the outcome identifier, and wherein content features with correlation values below a threshold are excluded from the subset of content features.

5. The computer-implemented method of claim 1, wherein training the machine learning model is performed at periodic intervals, and wherein a previous version of the machine learning model is utilized during training.

6. The computer-implemented method of claim 1, wherein training the machine learning model comprises:
    obtaining a predicted result for the outcome identifier for a plurality of pairs of the content items and the user identifiers; and
    adjusting at least one of the model parameters based on a comparison of the predicted result and the historical result.

7. The computer-implemented method of claim 6, wherein the training is performed iteratively, and is stopped when improvement in model performance between consecutive iterations falls below an improvement threshold.

8. The computer-implemented method of claim 1, wherein the historical user data includes per user aggregations of interaction events with a website or a software application associated with the recommendation specification.

9. The computer-implemented method of claim 1, further comprising:
    providing a graphical user interface that enables user selection of the recommendation specification.

10. The computer-implemented method of claim 1, further comprising:
    receiving a request for a recommendation, wherein the request includes a user identifier;
    generating, using the machine learning model, the recommendation that includes one or more recommended content items of the content type; and
    providing the recommendation in response to the request.

11. A computer-implemented method comprising:
    receiving a recommendation specification, by a machine learning model, that includes a content type and an outcome identifier;
    determining one or more model parameters for the machine learning model based at least in part on the recommendation specification;
    generating a historical user feature matrix (FM) based on historical user data;
    generating a historical content feature matrix (FM) based on historical content data;

obtaining, using the machine learning model, a plurality of user clusters based on the historical user FM;

partitioning each user cluster of the plurality of user clusters into two sets based on the historical content FM, wherein a first set includes user identifiers that were associated with a positive result for the outcome identifier for at least one content item of the content type and a second set includes user identifiers that were not associated with the positive result for the outcome identifier in the historical user data; and after the partitioning, obtaining a list of content items of the content type for each cluster, wherein the content items in the list are ranked based on a respective score.

12. The computer-implemented method of claim 11, wherein obtaining the plurality of user clusters is performed using k-means clustering, k-medians clustering, agglomerative clustering, or spectral clustering.

13. The computer-implemented method of claim 11, wherein obtaining the list is performed at periodic intervals.

14. The computer-implemented method of claim 11, further comprising, after the partitioning, storing the plurality of user clusters by storing a respective cluster feature vector for each of the plurality of user clusters.

15. The computer-implemented method of claim 14, further comprising:

receiving a request for a recommendation, wherein the request includes a particular user identifier;

mapping the particular user identifier to a particular cluster of the plurality of user clusters based on similarity between a user feature vector associated with the particular user identifier and the respective cluster feature vectors for the plurality of clusters; and providing one or more recommended content items from the list of content items of the particular cluster as the recommendation.

\* \* \* \* \*